United States Patent
Butterworth et al.

(10) Patent No.: US 7,468,753 B2
(45) Date of Patent: Dec. 23, 2008

(54) USE OF TELEPHONE-SPECIFIC COMPONENTS TO PROVIDE REFOCUSING IN A CAMERA-READY DEVICE

(75) Inventors: Mark Melvin Butterworth, Santa Clara, CA (US); John Phillip Ertel, Half Moon Bay, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 650 days.

(21) Appl. No.: 10/912,952

(22) Filed: Aug. 5, 2004

(65) Prior Publication Data

US 2006/0029379 A1 Feb. 9, 2006

(51) Int. Cl.
| | |
|---|---|
| *G03B 13/00* | (2006.01) |
| *G03B 17/00* | (2006.01) |
| *G03B 3/00* | (2006.01) |
| *G03B 13/22* | (2006.01) |
| *G03B 3/10* | (2006.01) |
| *G03B 13/34* | (2006.01) |
| *G02B 7/02* | (2006.01) |
| *H04N 5/232* | (2006.01) |
| *H04N 5/225* | (2006.01) |
| *H04B 1/06* | (2006.01) |
| *H05K 11/00* | (2006.01) |
| *H04M 1/00* | (2006.01) |

(52) U.S. Cl. .................. 348/357; 348/345; 348/374; 359/823; 396/75; 396/90; 396/132; 455/344; 455/556.1

(58) Field of Classification Search ............ 348/240.3, 348/345, 357, 373–6; 396/72, 75, 77–8, 396/90, 132, 144–145; 455/344, 556.1; 359/822–824

See application file for complete search history.

(56) References Cited

U.S. PATENT DOCUMENTS

| | | | | |
|---|---|---|---|---|
| 4,634,221 A | * | 1/1987 | Hopfner | 359/824 |
| 4,733,261 A | * | 3/1988 | Gunshi et al. | 396/90 |
| 4,769,664 A | * | 9/1988 | Namai et al. | 396/90 |
| 4,841,323 A | * | 6/1989 | Yamada et al. | 396/90 |
| 5,032,859 A | * | 7/1991 | Akimoto et al. | 396/132 |
| 5,313,244 A | * | 5/1994 | Arai | 396/132 |
| 6,476,985 B2 | * | 11/2002 | Dou et al. | 359/823 |
| 6,730,900 B2 | | 5/2004 | Hsish et al. | |
| 7,202,905 B2 | * | 4/2007 | Castaneda et al. | 348/373 |
| 7,210,629 B2 | * | 5/2007 | Cho et al. | 235/454 |
| 2003/0117497 A1 | * | 6/2003 | Nicolaisen et al. | 348/207.99 |
| 2004/0166894 A1 | * | 8/2004 | Shirakawa | 455/556.1 |
| 2006/0203116 A1 | * | 9/2006 | Kassenaar | 348/340 |

* cited by examiner

*Primary Examiner*—Lin Ye
*Assistant Examiner*—Daniel M Pasiewicz
(74) *Attorney, Agent, or Firm*—Ratner Prestia

(57) ABSTRACT

A telecommunications device includes a portable telephone unit having both wireless communication capability and image capture capability, with a refocusing arrangement that is mechanically driven by operations of telephone components primarily included to enable telephone functions that are independent from camera functions. In one embodiment, the incoming call alerting device, such as the vibrator motor, is used to provide refocusing actuation. In another embodiment, the telephone unit is a "flip phone" and the hinging operations store actuation force for refocusing operations. A ratchet cam may be used in the refocusing arrangement of the image capture capability.

23 Claims, 4 Drawing Sheets

USE OF TELEPHONE-SPECIFIC COMPONENTS TO PROVIDE REFOCUSING IN A CAMERA-READY DEVICE

BACKGROUND ART

Among the benefits of miniaturization in the electronics and the optics industries is the ability to integrate into a single unit two or more capabilities which were previously considered unrelated. An example is the cellular telephone camera having both wireless transmission capability and image capture capability. Images may be stored or may be transmitted using the same circuitry and antenna used for transmitting voice information.

In a cellular phone camera, the approaches to providing focus vary significantly with respect to complexity. For minimal complexity, a focus lens may be fixed in position. The fixed position may be a close focus mode (macro focus), if it is assumed that the unit will be used primarily for close range photography. As another possibility, the fixed position may be one that provides a compromise between enabling high resolution close-ups and enabling high resolution distance imaging. Alternatively, the fixed position may be a compromise within the range from providing optimal focus for nearby objects to providing optimal focus for distant objects.

A focusing approach that involves a much greater degree of complexity is one which incorporates the auto focusing systems of high-end digital cameras into the cellular telephone camera. Such systems may mount a focus lens onto a drive mechanism capable of changing the distance between the lens and an image sensor. The drive mechanism may be manipulated by a motor which is controlled on the basis of information from a range finder. Range finders receive light through the focus lens and determine the distance between the image plane of the lens and the plane of the sensor. One range finding technique is known as "phase difference detection." A controller receives the distance information from the range finder and activates the motor to move the lens the proper distance to place the image plane of the lens on the sensor. Unfortunately, such a system may add significantly to the cost of the cellular telephone.

A less complex approach that allows multiple focus positions is one that enables manual movement of a focus lens. For example, the user may selectively change from a position for optimal focus for distant objects and optimal position for nearby objects merely by maneuvering a lever or by rotating a focus-setting member.

While the various approaches function well for their intended purpose, each approach has its drawbacks.

SUMMARY OF THE INVENTION

A telecommunications device in accordance with the invention is a portable telephone unit having wireless communication capability and image capture capability, with a refocusing arrangement that is mechanically driven by operations of telephone components primarily included to enable telephone functions that are independent from the operations of the image capture capability. The telephone components which mechanically drive the refocusing arrangement are non-charge storage components. That is, the telephone components of interest include components other than the battery.

In one embodiment, the telephone component which is primarily included to enable telephone functions, but which performs "double duty" as a mechanical drive for the refocusing arrangement, is the alerting device that is responsive to call-detection circuitry for identifying an incoming telephone call. The alerting device may be a vibrator motor of the type used in conventional cellular telephones. Merely by way of example, the conventional vibrator motor may be adapted to include a spur gear that is driven with a clutch, so that the vibrator motor spins normally but the gear and clutch are connected to the refocusing arrangement to provide the mechanical drive of the refocusing arrangement.

Telephone components other than the vibrator motor may be used to achieve the mechanical drive. In another embodiment, the telephone unit is a "flip phone" in which a hinge connects first and second portions of the housing. As the telephone unit is opened and closed, the rotation along the hinge may be used as a means for directly or indirectly driving the refocusing arrangement. In a direct drive configuration, the refocusing arrangement is incremented to a next stable focus position each time that the telephone unit is opened or closed during an image capture operation. In an indirect drive configuration, the normal operations of opening and closing the telephone unit are used to provide energy storage. For example, the rotation at the hinge may be used to tighten a spring which stores potential energy for driving the refocusing arrangement, as needed. This configuration is similar to the arrangement of a watch in which a watch stem is coupled to a mainspring which stores potential energy as the clock stem is wound.

In one embodiment of the refocusing arrangement, a ratchet cam is used to define a mechanically stable condition for each of a number of focus positions. The ratchet cam may include a ratchet member and a lens barrel member. The ratchet member is driven by the operations of the telephone components, such as the vibrator motor. The focus lens is fixed to the lens barrel member. Similar to a retractable ball-point pen, the two members make contact along stepped surfaces. The two members are operatively associated such that actuation of the ratchet member linearly shifts and axially rotates the lens barrel member as a consequence of the steps. The stepped interface between the two members may include multiple saw tooth-shaped ratchet ramps to properly support the lens and maintain the axial alignment of the focus lens. Depending upon the number of steps, the interface may establish two, three or more stable focus positions.

For the vibrating mechanism of the silent ring option of a conventional cellular phone to be used to provide the mechanical drive, the "stroke" for the ratchet cam may be triggered by an eccentric weighted battery driven motor. Each time that the vibrating mechanism is activated, the ratchet will cycle to its next stable position. In order to enable a person to track the current focus setting, a contact closure may be used to identify the setting as the "macro" focal setting, the "distant" focal setting or an intermediate focal setting. However, as previously noted, other telephone components may be used to provide the mechanical drive in place of the vibrating mechanism.

DETAILED DESCRIPTION

Figure 1:
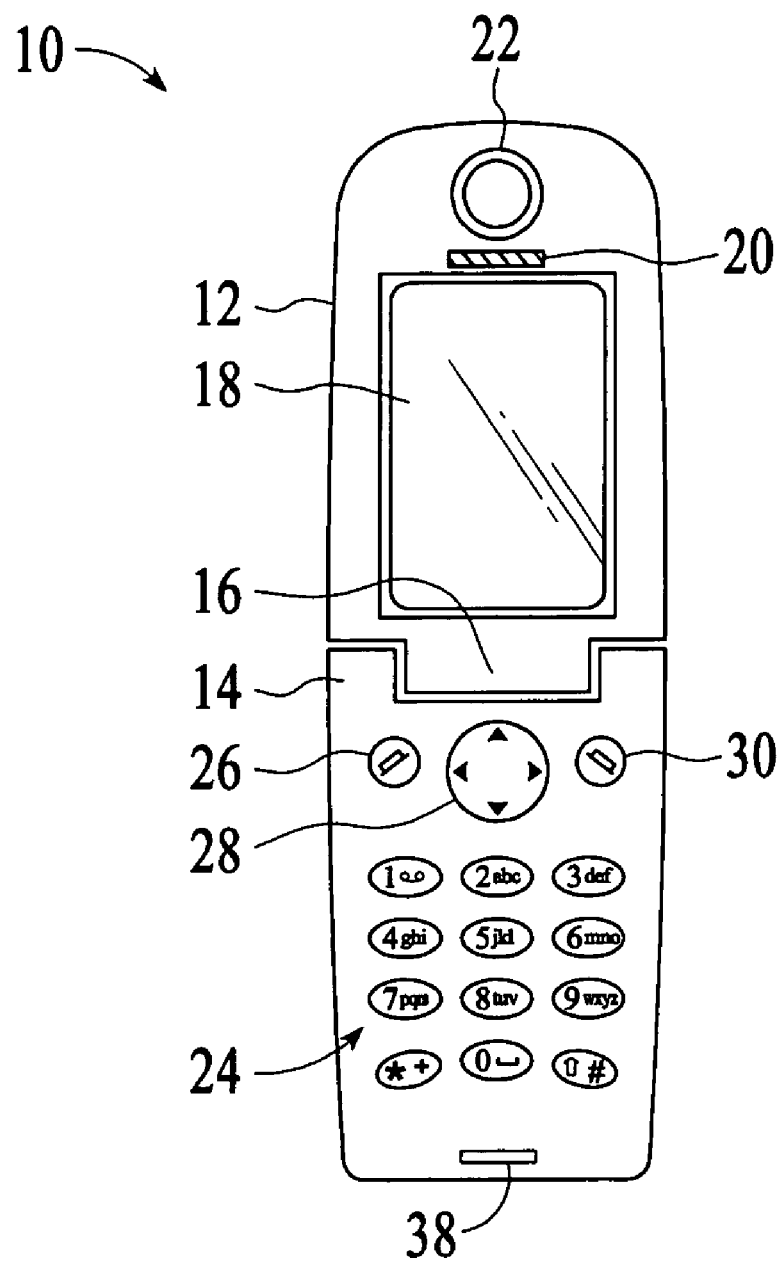
FIG. 1 is a front view of a cellular phone camera in accordance with the invention.
Figure 2:
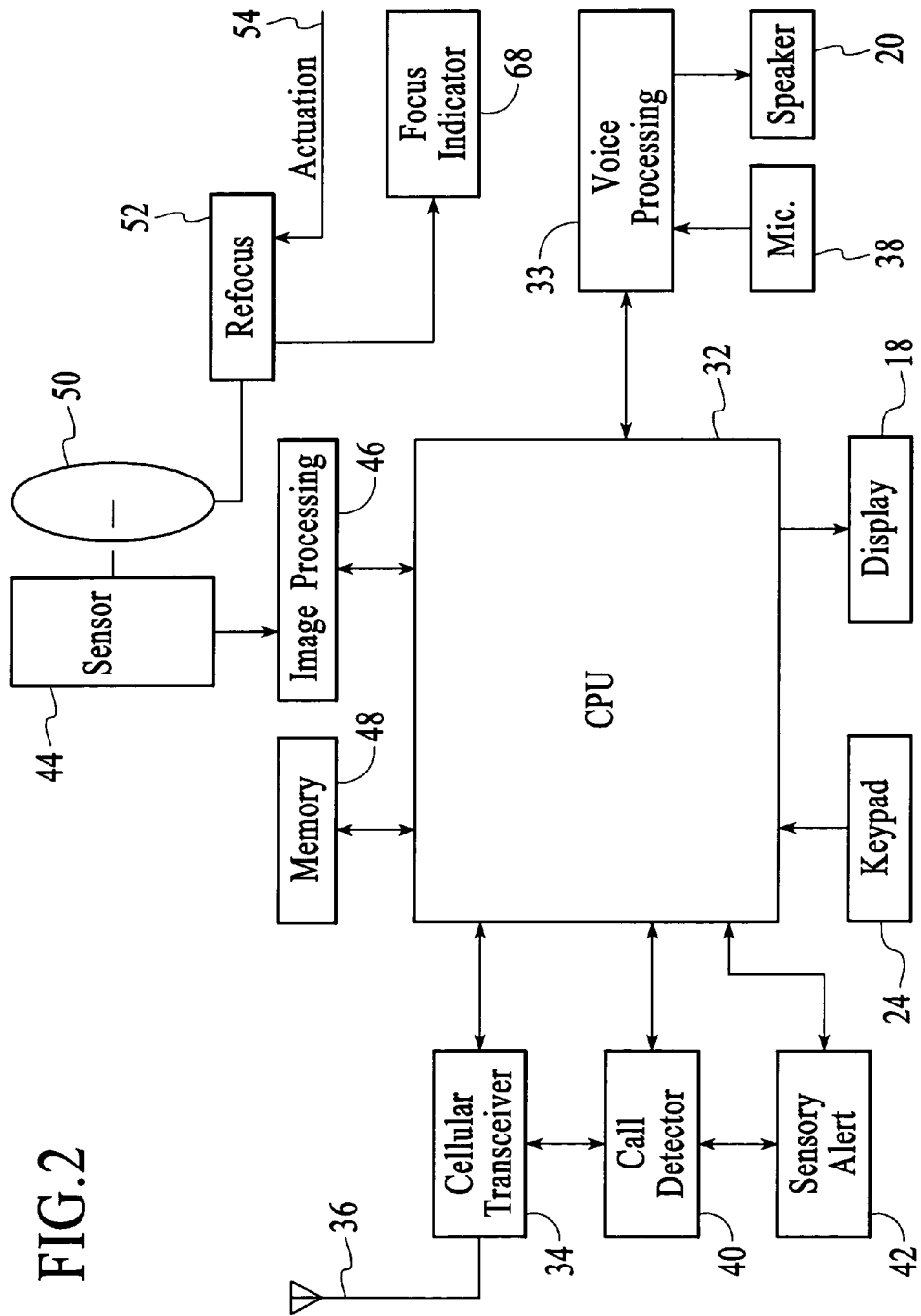
FIG. 2 is a block diagram of components of the cellular phone camera of FIG. 1.

With reference to FIGS. 1 and 2, one example of a cellular phone camera 10 is shown, but other configurations are within the scope of the invention. In the illustrated embodiment, the telecommunications device is a "flip phone" having a first portion 12 connected to a second portion 14 by a hinge 16. The first portion includes a display screen 18 for presenting information to a user and includes a speaker 20 located to be placed near the ear of a user involved in a telephone conversation. In the particular configuration, the first portion 12 of the housing also includes a camera opening 22 for viewing objects to be photographed during an image capture operation. The image capturing may be for still images or for continuous motion. As another alternative, the camera opening may be the shutter opening rather than the viewing opening, since the location of the camera capability is not significant to the invention.

The second portion 14 of the housing for the telephone unit includes a standard keypad 24, as well as three pressure switches 26, 28 and 30 which may be used for controlling operations. The center switch 28 enables four-way selection of items which may be presented on the display screen 18.

In FIG. 2, a single central processing unit (CPU) 32 is used in providing the wireless communication capability and the image capture capability. Alternatively, more than one CPU may be used. The wireless communication capability is enabled primarily by voice processing programming 33 and a cellular transceiver 34 connected to an antenna 36. The voice processing is shown as having an input from a microphone 38 and having an output to the speaker 20 of FIG. 1. The microphone 38 is illustrated as being at the lower region of the second portion 14 of the housing in the embodiment of FIG. 1. The cellular transceiver 34 is a conventional component which provides power amplification for output signals and amplification for the input signals.

The wireless communication capability also includes a call detector 40 and a sensory alert 42. The call detector identifies received signals that are indicative of an incoming call and then triggers the sensory alert to notify a user of the telecommunications device. There may be more than one type of sensory alert. Typical alerts are audible, but vibrational alerts are used as the "silent ring" option for a cellular phone.

The image capture capability is provided by a sensor 44 connected to image processing programming 46. A memory device 48 enables storage of images and storage of information related to the wireless communication capability, such as a list of commonly called telephone numbers.

The implementation of the sensor 44 is not critical. As one possibility, the sensor is a two-dimensional array of pixels that individually generate signals indicative of sensed light intensity. The sensor is optically aligned with an optical member 50. The optical member may be a single focus lens or may be a cooperation of different optical elements. For simplicity, the optical member will be referred to merely as a focus lens. As previously noted, a focus lens may be fixed in its position relative to the sensor 44. However, the invention allows the focus lens to be reset so as to provide high quality imaging of close-up objects and high resolution imaging of distant objects. Here, the lens may be automatically changed from its macro focus to its distant focus positions without user intervention. A refocusing arrangement 52 is shown as being linked to the focus lens 50. The refocusing arrangement is mechanically driven by operations of telephone components that are primarily included to enable telephone functions, rather than camera functions. This mechanical drive is represented by the actuation force 54 applied to the refocusing arrangement.

The actuation force that is applied to the refocusing arrangement 52 may be the activation of the vibrator motor of the sensory alert 42, so that the vibrator motor performs "double duty." As one possibility, the motor traveling clockwise moves the focus lens 50 to a far distance focus setting. Then, when the motor is reversed, the lens moves to a close-up focus setting. The vibrator motor may have a spur gear and the refocusing arrangement may have a rack. The spur gear is then driven by the vibrator motor with a clutch. Thus, the gear and clutch provide the repositioning of the focus lens.

Figure 3:
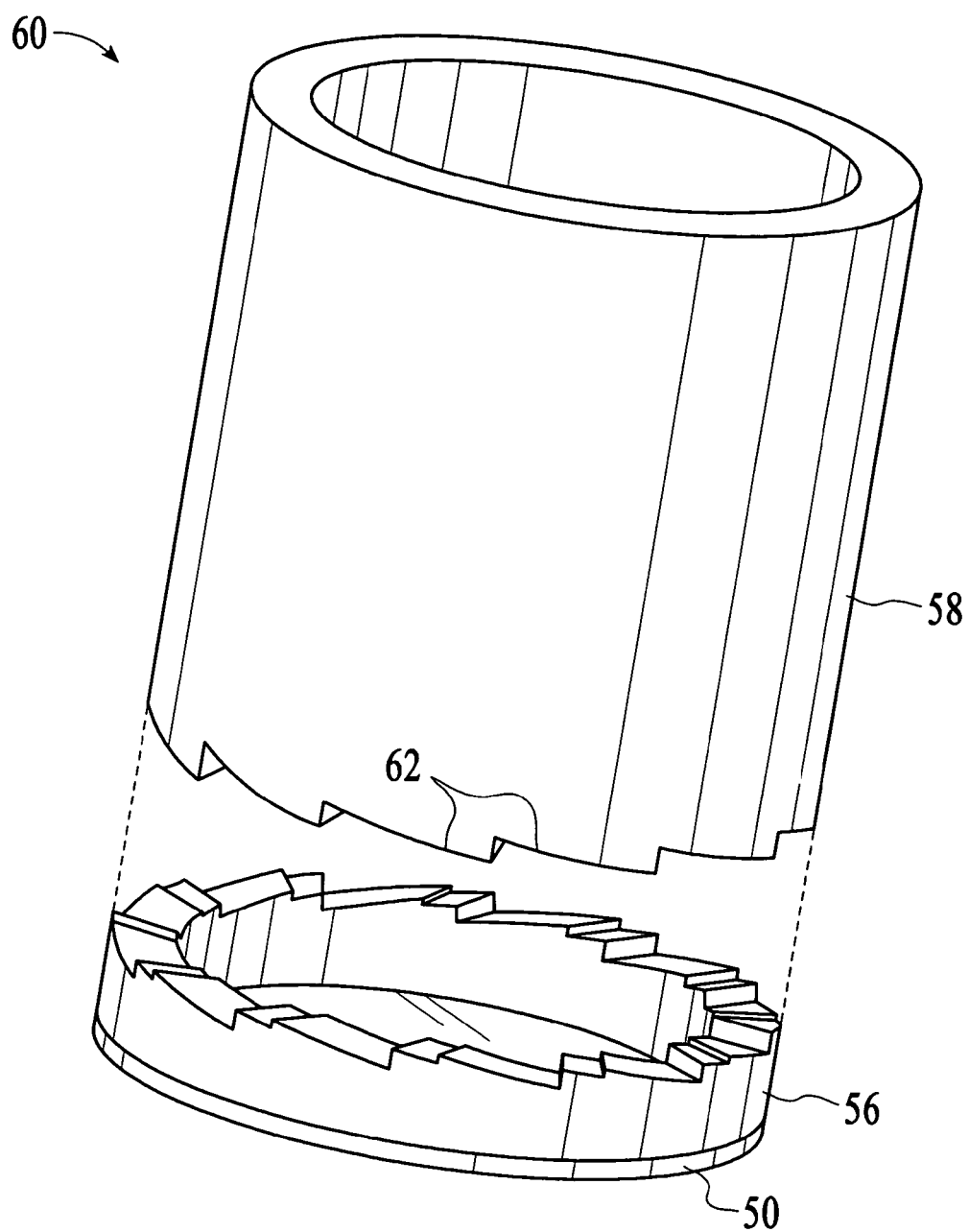
FIG. 3 is a perspective view of a ratchet cam for use in the cellular phone camera of FIG. 1 as one approach to a refocusing arrangement in accordance with the invention.
Figure 4:
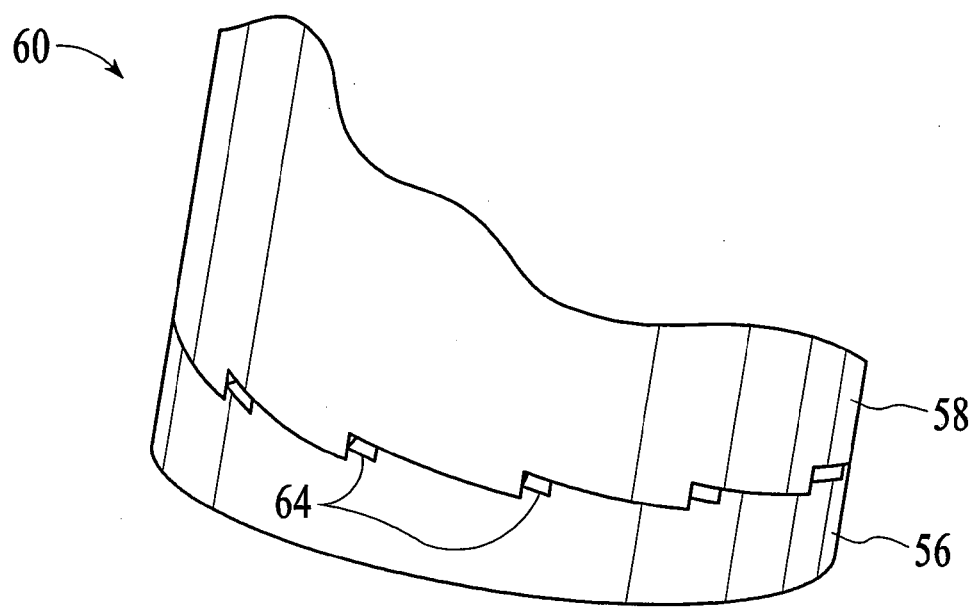
FIG. 4 is a front view of a portion of the ratchet cam of FIG. 3 shown in a first stable focus position.
Figure 5:
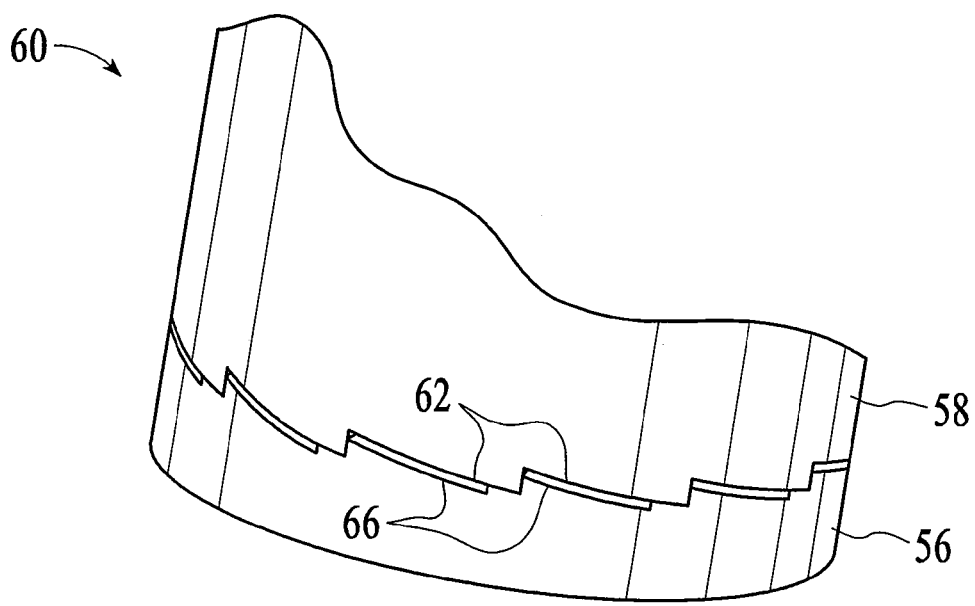
FIG. 5 shows the same portion of the ratchet cam of FIG. 4, but in a second stable focus position.

An embodiment of a refocusing arrangement 52 that includes a ratchet cam 60 is illustrated in FIGS. 3, 4 and 5. This embodiment is similar to the structure of a retractable ballpoint pen. While the pen typically includes only two stable positions, persons skilled in the art will recognize that additional stable positions are easily incorporated. The ratchet cam 60 includes a lens barrel member 56 and a ratchet member 58. As shown in FIG. 3, the focus lens 50 is connected to the lower surface of the lens barrel member. The upper surface of the lens barrel member is stepped to define the different stable focus positions. Similarly, the lower surface of the ratchet includes ramps. Thus, the ratchet cam 60 operates as a rotating mechanism that provides two or more stable positions of the focus lens along the axis of rotation of the ratchet cam.

FIGS. 4 and 5 illustrate different stable focus positions of the ratchet cam 60. FIG. 4 may be considered to be the retracted position, while FIG. 5 shows the extended position. The ratchet member 58 includes ramps 62. The lens barrel member 56 includes shortened steps 64 that are exposed in FIG. 4 and includes elongated steps 66 that are exposed in FIG. 5. Rotation of the lens barrel member changes the seating of the ramps between abutment with the shortened steps and abutment with the elongated steps. However, the focus lens remains in alignment with the optical axis and, therefore, in alignment with the sensor 44 of FIG. 2. Due to the direction of the ramps 62 of the ratchet member 58, rotation is possible in only one direction, either clockwise or counterclockwise. Incremental rotation is limited to single steps of the ratchet "stroke," providing alternating focus positions for each increment as the ratchet settles to one of the positions shown in FIGS. 4 and 5. A spring (not shown) may be required to maintain the lens barrel member in engagement with the ratchet member. However, only small axial motions are required to set the focus lens for macro focus versus normal distant focus. It is believed that a 500 micron difference in axial position is all that is necessary to shift the focus lens for typical cellular phone cameras.

As previously noted, the actuation force for the "stroke" of the ratchet cam 60 may be provided by the vibrator motor that is also used to provide the sensory alert 42 function of FIG. 2. The vibrator motor may be an eccentric-weighted battery operated motor. With each activation of the motor, the lens barrel member 56 of the ratchet cam 60 is cycled to its next position. In this application, it is desirable to maintain the count of the number of vibrator actuations/strokes in order to identify the current focus setting. For this purpose, a contact closure may be used in one particular focus position to identify the macro or distant focal setting. In FIG. 2, the components include such a focus indicator 68.

The ratchet cam 60 concept may be extended to provide more than two discrete focus positions by including a greater number of sets of steps 66 and 68. For example, the ratchet cam may define a portrait focus position and a landscape focus position for each of close-up and distant objects. The only concern is that the movement from the most retracted position to the most extended position of the lens barrel member would require passing through a number of intermediate positions, since the step heights would be sequential.

As an alternative source of actuation power for the ratchet cam, the movements of the hinge 16 in FIG. 1 may be employed. For example, each time the first housing portion 12 moves relative to the second housing portion 14, the focus position may be incremented. However, a more desirable configuration is one in which opening and closing the flip phone induces the storage of potential energy that can subsequently be used in providing the actuation power. As one embodiment, the hinge may be coupled to a mainspring in the same manner that a stem of a watch is coupled to a clock spring. As a result, opening and closing the cellular phone camera 10 will wind the spring and enable subsequent release of the energy as actuation force for incrementing the focus position. Other means for providing the actuation force on the basis of operations of telephone components primarily included to enable telephone functions are also within the scope of the invention.

What is claimed is:

1. A telecommunications device comprising:
    a portable telephone unit that includes a housing and circuitry enabling wireless telecommunications;
    a camera integrated with said portable telephone, said camera including an imaging sensor and an optical member having a plurality of focus positions with respect to said sensor; and
    a refocusing arrangement for manipulating said optical member with respect to said focus positions, said refocusing arrangement being mechanically driven by operations of telephone components primarily included to enable functions of said telephone unit independently from operations of said camera;
    wherein said refocusing arrangement includes:
        a ratchet member having said optical member fixed thereto, the ratchet member having a plurality of ramp members, each of the ramp members includes at least first and second step portions, as a respective set, a contacting surface of the first step portion of each respective set is elongated relative to a contacting surface of the second step portion of the respective set, and
        a displacement member, the ratchet member rotatable with respect to the displacement member to form a ratchet cam, the displacement member including a plurality of ramp portions, each slidably in contact with a corresponding ramp member of said ratchet member such that actuation of said ratchet member linearly displaces said displacement member to a next focus position.

2. The telecommunications device of claim 1, wherein said telephone components which mechanically drive said refocusing arrangement are non-charge storage components.

3. The telecommunications device of claim 1, wherein said portable telephone unit includes a vibrational motor that is connected to be responsive to detection of incoming calls, said vibrational motor being one of said telephone components which mechanically drives said refocusing arrangement.

4. The telecommunications device of claim 3, wherein said refocusing arrangement is configured to establish at least first and second stable focus positions.

5. The telecommunications device of claim 4, wherein said ratchet member includes a set number of rest positions that define at least first and second stable positions.

6. The telecommunications device of claim 1 wherein said telephone unit includes first and second portions connected by a hinge to enable a flip phone function, said operations which mechanically drive said refocusing arrangement being uses of said flip phone function.

7. The telecommunications device of claim 6 wherein said refocusing arrangement includes a spring which is tightened with each said use of said flip phone function, thereby providing energy for mechanically driving said refocusing arrangement.

8. The telecommunications device of claim 1, wherein said displacement member includes a stable position for each focus position of said optical member.

9. The telecommunications device of claim 8, wherein said displacement member and said ratchet member are in contact along stepped regions that are configured to define said plurality of focus positions.

10. The telecommunications device of claim 1, wherein for each focus position, the ratchet member and the displacement member are in contact along at least two nonparallel planes to establish each respective focus position as a stable focus position.

11. A cellular telephone comprising:
    wireless communication capability, including programming for processing voice information and including telephone-related components having mechanical characteristics that are evident to a user during intended operations of said wireless communication capability; and
    image capture capability, including a camera and a focal lens having a plurality of preselected stable focus positions and a mechanical assembly for moving said focus lens to said focus positions, said mechanical assembly being powered as a direct consequence of said mechanical characteristics of said telephone-related components,
    wherein said mechanical assembly includes a ratchet member having a plurality of ramp members, each of the ramp members includes at least first and second step portions, as a respective set, a contacting surface of the first step portion of each respective set is elongated relative to a contacting surface of the second step portion of the respective set such that the first step portion of each set defines a first stable position of the plurality of focus positions and the second step portion of each set defines a second stable position of the plurality of focus positions.

12. The cellular telephone of claim 11, wherein said telephone-related components having said mechanical characteristics that power said mechanical assembly include a vibrational device connected to provide an alert of a presence of an incoming call.

13. The cellular telephone of claim 12, wherein said mechanical assembly includes a cam configured to define said plurality of focus positions, said cam including said ratchet member and actuated by operation of said vibrational device.

14. The cellular telephone of claim 13, wherein said cam is a ratchet cam and said ratchet member includes a lens barrel member such that said lens barrel member has a focus lens location that varies along an axis of said ratchet cam when said ratchet cam is actuated, said focus lens being fixed to said lens barrel member.

15. The cellular telephone of claim 13 wherein said telephone-related components having said mechanical characteristics that power said mechanical assembly include a hinge which couples first and second housing positions, said mechanical assembly including an energy-storing member that is operatively associated with manipulations of said hinge.

16. A telecommunications device comprising:
 a telephone unit that includes voice processing circuitry for enabling wireless voice communications and call detection circuitry for detecting an incoming telephone call;
 an alerting device that is responsive to said call detection circuitry to provide a sensory alert upon detection of an incoming call;
 a camera incorporated into said telephone unit for generating image information; and
 a camera focus assembly having a focus lens and a cam for selectively moving said focus lens among a plurality of preselected focus positions, said focus lens being optically aligned with said camera, said alerting device being connected to said cam so as to function as an actuator with respect to said moving said focus lens,
 wherein said cam includes:
 a rotatable member, having the focus lens fixed thereto, for actuating said focus lens, the rotatable member includes a plurality of different sets of ratchet portions such that each ratchet portion of a respective set includes cam contacting regions of respectively different lengths to define respectively different stable rest positions for the focus lens, and
 a displacement member, the rotatable member being rotatable with respect to the displacement member, said displacement member including a plurality of ramp portions, each slidably in contact with a corresponding ratchet portion of said rotatable member such that actuation of said rotatable member linearly displaces said displacement member to a next stable focus position.

17. The telecommunications device of claim 16, wherein said alerting device includes a vibrating motor.

18. The telecommunications device of claim 16, wherein said cam is a ratchet cam having a stable rest position for each of said preselected focus positions.

19. The telecommunications device of claim 18, wherein said ratchet cam includes the displacement member and the rotatable member, said displacement member and said rotatable member making contact along the cam contacting regions of one of the respectively different lengths of each respective set of ratchet portions to define a corresponding stable rest position for the focus lens.

20. The telecommunications device of claim 19, wherein said ratchet portions of each respectively different set are formed in a sequence on the rotatable member, the displacement member includes the plurality of ramp portions, each corresponding to the sequence of one set of ratchet portions of the rotatable member.

21. The telecommunications device of claim 19, wherein the rotatable member includes a sequence of the cam contacting regions that have lengths that alternate in the sequence between a first contact length and a second contact length.

22. The telecommunications device of claim 19, wherein an overall length of the cam contacting regions of the respectively different lengths for each set of the rotatable member is the same length as a length of a cam contacting region of each ramp portion of the displacement member.

23. The telecommunications device of claim 16, further comprising a focus indicator including:
 a sensor for detecting when the focus lens is in one of the plurality of preselected focus positions; and
 a counter for storing a count value for a number of motor actuations to identify a current focus position using detection results from the sensor.

* * * * *